(12) United States Patent
Nee et al.

(10) Patent No.: US 9,060,467 B2
(45) Date of Patent: Jun. 23, 2015

(54) TRACK-ROLLER-HANGER ASSEMBLY FOR ADJUSTABLE HANGING OF ARTICLES

(71) Applicants: Robert Nee, Tucson, AZ (US); Joel Mueller, Tucson, AZ (US)

(72) Inventors: Robert Nee, Tucson, AZ (US); Joel Mueller, Tucson, AZ (US)

(73) Assignee: GSS Industries, LLC., Tucson, AZ (US)

( * ) Notice: Subject to any disclaimer, the term of this patent is extended or adjusted under 35 U.S.C. 154(b) by 165 days.

(21) Appl. No.: 13/673,683

(22) Filed: Nov. 9, 2012

(65) Prior Publication Data

US 2013/0118072 A1 May 16, 2013

Related U.S. Application Data

(60) Provisional application No. 61/558,548, filed on Nov. 11, 2011.

(51) Int. Cl.
| | |
|---|---|
| F21V 21/34 | (2006.01) |
| F21V 21/02 | (2006.01) |
| A01G 9/02 | (2006.01) |
| F16M 13/02 | (2006.01) |
| A47G 7/04 | (2006.01) |

(52) U.S. Cl.
CPC .............. *A01G 9/024* (2013.01); *F16M 13/022* (2013.01); *F21V 21/025* (2013.01); *F21V 21/34* (2013.01); *A47G 7/045* (2013.01)

(58) Field of Classification Search
CPC .... E04B 9/006; A22C 15/003; A22C 15/005; F21S 8/06; F21S 8/066; F21S 8/061; F21S 8/063; F21V 21/02; F21V 21/025; A01G 9/024; A47G 7/042; A47G 7/045; A47G 7/047

USPC .............. 248/323, 339, 340, 342, 343, 298.1; 52/39; 294/85; 452/187; 47/67
See application file for complete search history.

(56) References Cited

U.S. PATENT DOCUMENTS

| | | | | |
|---|---|---|---|---|
| 858,840 | A * | 7/1907 | Leeuwen, Jr. ................. | 248/318 |
| 1,717,156 | A * | 6/1929 | Johansson ..................... | 248/307 |
| 2,435,755 | A * | 2/1948 | Schimpff ........................ | 186/53 |
| 2,611,492 | A * | 9/1952 | Watts ............................. | 211/113 |
| 2,843,872 | A * | 7/1958 | Hannon ......................... | 16/105 |
| 3,321,090 | A * | 5/1967 | Greenstadt .................... | 211/162 |
| 3,431,585 | A * | 3/1969 | Foltz ............................. | 16/94 D |
| 3,618,176 | A * | 11/1971 | Barnes ......................... | 248/227.4 |
| 3,912,214 | A * | 10/1975 | Karass .......................... | 248/323 |
| 4,094,415 | A * | 6/1978 | Larson ......................... | 211/57.1 |
| 4,116,134 | A * | 9/1978 | Troth ............................ | 104/111 |
| 4,226,394 | A * | 10/1980 | Einhorn .................. | 248/223.41 |
| 4,255,070 | A * | 3/1981 | Calhoun .................... | 405/259.5 |
| 4,318,252 | A * | 3/1982 | Janson ............................. | 52/39 |
| 4,512,118 | A * | 4/1985 | Rasmussen ...................... | 52/39 |
| 4,592,527 | A | 6/1986 | Karapita | |
| 4,699,437 | A * | 10/1987 | Genereaux .................... | 312/248 |
| 4,775,127 | A * | 10/1988 | Nakamura .................... | 248/489 |
| 5,188,332 | A * | 2/1993 | Callas ........................... | 248/544 |
| 5,480,116 | A * | 1/1996 | Callas .......................... | 248/228.4 |

(Continued)

*Primary Examiner* — Michael Safavi
(74) *Attorney, Agent, or Firm* — Michael J. Curley; Quarles & Brady LLP

(57) ABSTRACT

An apparatus for hanging of decorative or utilitarian articles such as potted plants is provided. The apparatus has a c-channel track defining an inner channel and a rolling-bearing element sized to roll therealong. A hanger is attached to the rolling-bearing element for hanging decorative or utilitarian articles. The arrangement allows for articles to positioned anywhere along the track.

13 Claims, 4 Drawing Sheets

(56) References Cited

U.S. PATENT DOCUMENTS

| | | | |
|---|---|---|---|
| 5,862,925 A | 1/1999 | Grzywinski | |
| 6,131,866 A * | 10/2000 | Kesinger | 248/225.11 |
| 6,273,385 B1 * | 8/2001 | Hambleton | 248/304 |
| 6,749,156 B1 * | 6/2004 | Buehlmeyer et al. | 248/48.1 |
| 6,808,150 B1 * | 10/2004 | Roetenberg | 248/317 |
| 7,152,838 B2 * | 12/2006 | Taulbee | 248/307 |
| 7,661,640 B2 * | 2/2010 | Persson | 248/225.11 |
| 7,805,904 B2 * | 10/2010 | Clark et al. | 52/506.06 |

* cited by examiner

TRACK-ROLLER-HANGER ASSEMBLY FOR ADJUSTABLE HANGING OF ARTICLES

CROSS REFERENCE TO RELATED APPLICATIONS

This application claims priority to U.S. Provisional Application No. 61/558,548, filed on Nov. 11, 2011. The disclosure of the above-referenced application is incorporated by reference herein in its entirety.

BACKGROUND OF THE INVENTION

The invention relates generally to decorative elements for outdoor living spaces, in particular, patios.

Patios or open porches are common architectural features of homes or businesses. Home or business owners often suspend decorative articles from patio lintels or ceiling beams. Potted plants in particular are often hung from patio lintels to provide a decorative effect, to attract humming birds, or to provide a sunlight and noise barrier. Other decorative articles are hung on patios as well, for example, mobile sculptures or wind chimes. Conventionally, decorative articles are hung from fixed hooks installed in ceiling beams or lintels.

SUMMARY OF THE INVENTION

Embodiments of the invention relate generally to systems for hanging potted plants or other decorative or utilitarian articles from horizontal beams, for example, of the sort that are found on patios or other covered spaces outside of homes or businesses. In particular, embodiments of the invention are directed to an improved method and apparatus for hanging decorative articles such as potted plants using an assembly comprising a track, a rolling-element bearing and a hanger.

In one embodiment, an apparatus is provided for hanging decorative or utilitarian articles. The apparatus comprises a track having an upper rear face, a lower rear face, a lower face, and a lower lip. The track defines an interior channel and the upper rear face and said lower rear face define a plurality of through holes for fastening the track to a vertical surface. The apparatus also includes a rolling-element bearing sized to fit inside of the interior channel and roll along an interior surface opposite the lower face. The apparatus also includes a hanger coupled to the rolling-element bearing, which bends around said lower lip, and hangs below said track.

In another embodiment, the track includes an upper face and an upper lip, the track is a c-channel track, and the upper lip and lower lip define a front-facing gap that is sized such that the rolling-element bearing cannot pass through the gap.

In another embodiment, the lower lip defines a plurality of cut-away sections sized to allow passage of the rolling-element bearing through said gap. In another embodiment, the upper lip defines a plurality of cut-away sections sized to allow passage of the rolling-element bearing through the gap.

In one embodiment, the interior surface opposite the lower face defines a plurality of detents sized to partially capture the rolling-element bearing and create resistance to the motion thereof. In one embodiment, the interior surface defines a plurality of through-slots passing from the lower surface to said interior channel to facilitate the draining of liquid from the interior channel.

In one embodiment, the hanger includes an asymmetric tilted u-shaped portion having a point of lowest elevation, where the point of lowest elevation is located along a vertical line extending down from the rolling-element bearing.

Embodiments of the invention have certain associated advantages. Where fixed hooks provide only static hanging locations for decorative articles, embodiments of the invention allow for decorative articles to be arbitrarily and dynamically located without having to install additional fixed hooks. This is useful for repositioning plants as sunlight changes during the course of the day, or during changing seasons. Additionally, all plants hanging from a given track can be moved to one end, for example, to facilitate watering.

DETAILED DESCRIPTION OF THE INVENTION

Figure 1:
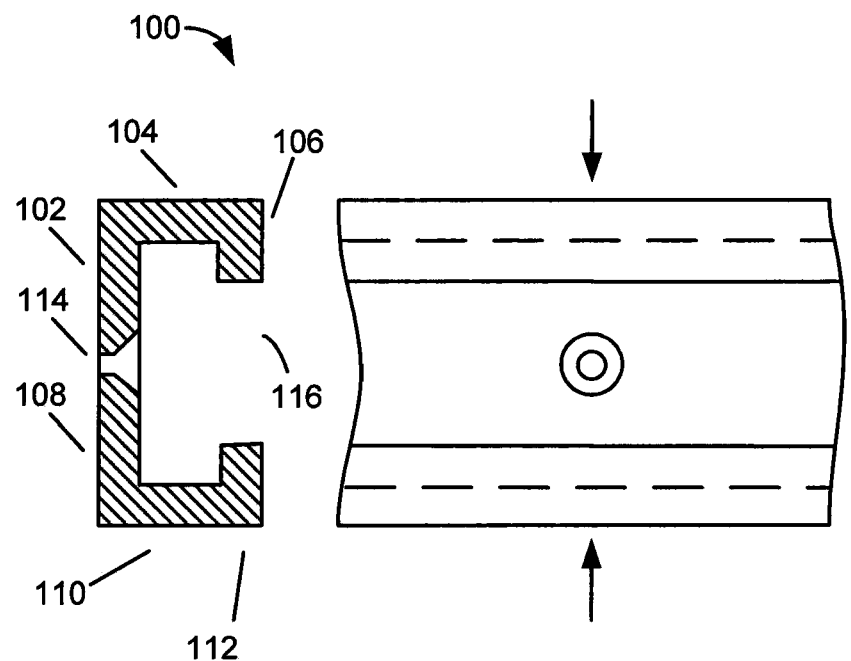
FIG. 1 is a truncated front view and cross section of a side-mounted track according to an embodiment of the invention.

FIG. 1 is a truncated front and cross sectional view of a side-mounted track according to an embodiment of the invention. Track 100 comprises a c-channel member having an upper face 104, an upper lip 106, an upper rear face 102, a lower rear face 108, a lower face 110, and a lower lip 112. In one embodiment, rail 100 is formed of extruded aluminum where upper rear face 102 and lower rear face 108 together form a rear face for the C-channel member measuring approximately 1" in height. Track 100 has a gap 116 disposed in a front surface otherwise defined by upper lip 106 and lower lip 112. Gap 116 is sized to prevent the passage of a rolling-element bearing coupled to a hanger, when said rolling-element bearing is situated within the passage defined by the track 100. A fastener hole 114 is defined in a rear surface of track 100 along a line separating upper rear face 102 and lower rear face 108. In one embodiment, fastener hole 114 is defined by a truncated conical opening proximate to a cylindrical opening in a rear face of the track 100. Fastener hole 114 is used to fasten track 100 to a structural beam or similar surface from which a user wishes to hangs potted plants or other articles. Upper rear face 102, lower rear face 108, lower lip 112 and upper lip 106 are vertically arranged, while upper lip 106 and lower lip 112 are horizontally arranged.

Figure 2:
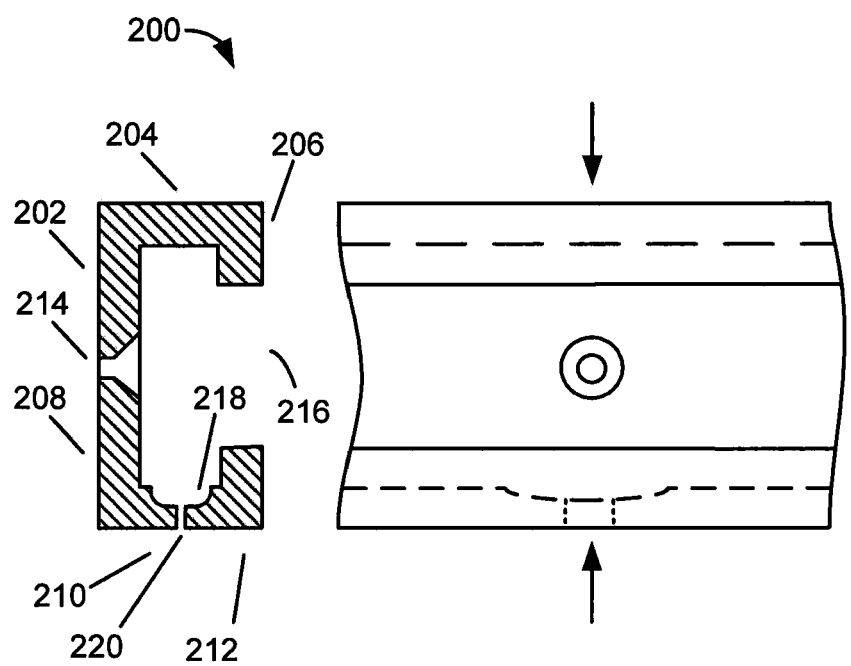
FIG. 2 is front view and cross section of a side-mounted track according to an embodiment of the invention having a detent for engaging a rolling bearing and a drainage slot.

FIG. 2 is a truncated front and cross sectional view of a side-mounted track according to an embodiment of the invention. As in the embodiment of FIG. 1, a track 200 comprises a C-channel member having an upper face 204, an upper lip 206, an upper rear face 202, a lower rear face 208, a lower face 210, and a lower lip 212. In one embodiment, rail 200 is formed of extruded aluminum where upper rear face 202 and lower rear face 208 together form a rear face for the C-channel member measuring approximately 1" in height. Track 200 has a gap 216 disposed in a front surface otherwise defined by upper lip 206 and lower lip 212. Gap 216 is sized to prevent the passage of a rolling-element bearing coupled to a hanger, when said rolling-element bearing is situated within the passage defined by the track 200. A fastener hole 214 is disposed in a rear surface of track 200 along a line separating upper rear face 202 and lower rear face 208, and in certain embodiments, is arranged along a line bisecting the gap 216. In one embodiment, fastener hole 214 is defined by a truncated conical opening proximate to a cylindrical opening in a rear face of the track 200. Fastener hole 214 is used to fasten track 200 to a structural beam or similar surface from which a user wishes to hangs potted plants or other articles.

In the embodiment of FIG. 2, lower face 210 includes elongated detents 218, or lozenge shaped depressions in the interior surface of track 200 opposite lower face 210. Detents 218 are sized to capture a rolling-element bearing and prevent free movement of same along the bottom interior surface of track 200. This feature allows rolling-element bearings to resist motion in the event of, for example, wind or off-level mounting of track 200. Detents 218 are spaced frequently along the length of track 200 to prove a user with multiple stable mounting positions for positioning objects hanging from rollers engaging detents 218. In one embodiment, detents 218 are spaced every six inches along the length of track 200. As an optional feature in certain embodiments, lower face 210 defines through-slots 220 running parallel to a long axis of track 200 along the bottoms of detents 218. Through-slots 220 permit the drainage of water from the interior channel defined by track 200. Other embodiments, for example, the embodiments of FIGS. 1 and 3-4 also optionally include through-slots for water drainage, but without detents 218.

Figure 3:
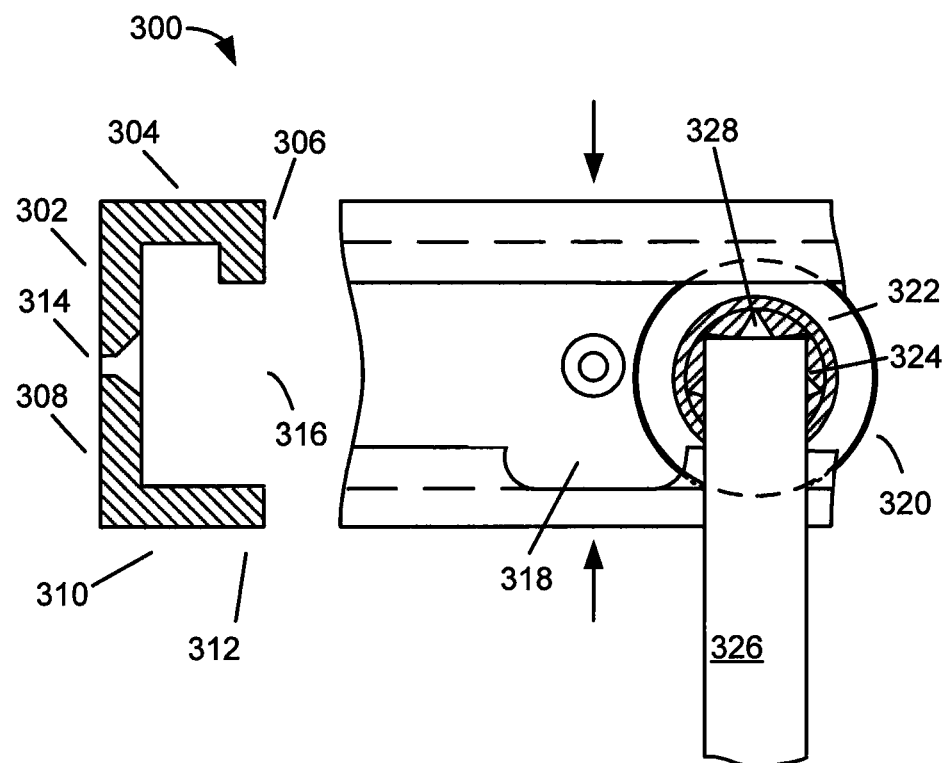
FIG. 3 is front view and cross section of a side-mounted track according to an embodiment of the invention having a cut-away lower-front face.

FIG. 3 is front view and cross section of a side-mounted track according to an embodiment of the invention having a cut-away lower-front face. The embodiment of FIG. 3 is similar to the embodiment of FIG. 1, except that the embodiment of FIG. 3 includes a cut-away portion 318 defined by the lower lip portion 312 of track 300. The cut away portion has the effect of increasing the size of gap 316, in certain areas of the track, to allow passage of rolling-element bearing into the interior channel defined by C-channel track 300. A similar cut-away portion in an upper lip portion 306 would also be within the scope of the invention, as would a pair of opposing cutaways in the upper lip 306 and lower lip 312 portions. This allows for a user to hang articles from a rolling-element bearing starting from the interior of the track 300, as opposed to inserting a rolling-element bearing at the edge of track 300. In certain embodiments, multiple cut-aways 318 are disposed along track 300 at convenient intervals, for example, every 12 inches, so as to give a user multiple entry-points for hangers along the length of track 300. In certain embodiments, each cut-away is sized to be slightly larger than the outside diameter of a rolling-element bearing. In one embodiment, the length of cut-away 318 is approximate 1 inch. Where a cut-away 318 is not present, lower lip 312 remains defined and is present to engage a rolling-element bearing.

FIG. 3 also shows rolling-element bearing assembly 320. Rolling-element bearing assembly 320 comprises an outer cylindrical roller 322, which engages a lower interior surface of track 300 and is adapted to roll thereon. In certain embodiments the lower interior surface of track 300 is coated to reduce rolling friction, e.g., with Teflon® or some similar coating. Over most of the length of track 300, rolling-element bearing assembly 320 is engaged by lower lip 312, and by upper lip 306, as illustrated. Rolling-element bearing assembly 320 also includes inner cylindrical roller 324. Between inner cylindrical roller 324 and outer cylindrical roller 322 are non-illustrated internal cylindrical or spherical bearings that allow inner cylindrical roller 324 to rotate freely with respect to outer cylindrical roller 322. Rolling-element bearing assembly 320 also includes hanger 326, the extent of which has been truncated for the sake of clarity. In one embodiment, hanger 326 is made of bent 0.25" steel rod stock bent into a hook shape. In certain embodiments, hanger 326 is coated to prevent rust. One end of hanger 326 includes a knurled region 328 for engagement with inner cylindrical roller 324. In certain embodiments, a non-illustrated adjustable set-screw is provide at one or both ends of track 300 to prevent one or more rolling-element bearings from rolling out of track 300.

Certain embodiments include non-illustrated fasteners that engage fastener holes 314. Fasteners are used to mount track 300 to non-illustrated surface, for example, a structural cross-member of the type that may be found on a patio. In certain embodiments, the fasteners used are flat head screws sized such that they do not project above the plane of the rear interior surface of track 300 when they are fully installed. In this way, the flat head screws do not interfere with the passage of rolling element bearing assembly 320. However, in certain embodiments, fasteners used for the first and last fastener holes 314 along track 300 are machine head screws, which are sized such that when they are fully installed, their heads project above the plane of the rear interior surface of track 300. In this way, the machine head screws in the first and last fastener holes 314, interfere with the passage of rolling element bearing assembly 320 (or multiple rolling element bearing assemblies) and thereby capture the rolling element bearing assemblies and prevent them from leaving through the open ends of track 300.

It is contemplated that in order to install the apparatus according to an embodiment of the invention, the user will secure track 300 using interior fastener holes 314 (i.e., holes that are not the first or last holes, or the endmost holes of the track) with flat head screws. Then the user will load the track 300 with multiple rolling element bearing assemblies 320, and then will secure the rolling element bearing assemblies within the track by using machine head screws on the first and last, or endmost fastener holes 314. Other means of preventing rolling element bearing assemblies from rolling out of the track are permissible and within the scope of the invention. For example, end caps that slip over the ends of the track, plugs that are inserted around or into the open ends of the track, or any other equivalent means for selectively blocking the open ends of the track are acceptable.

Figure 4:
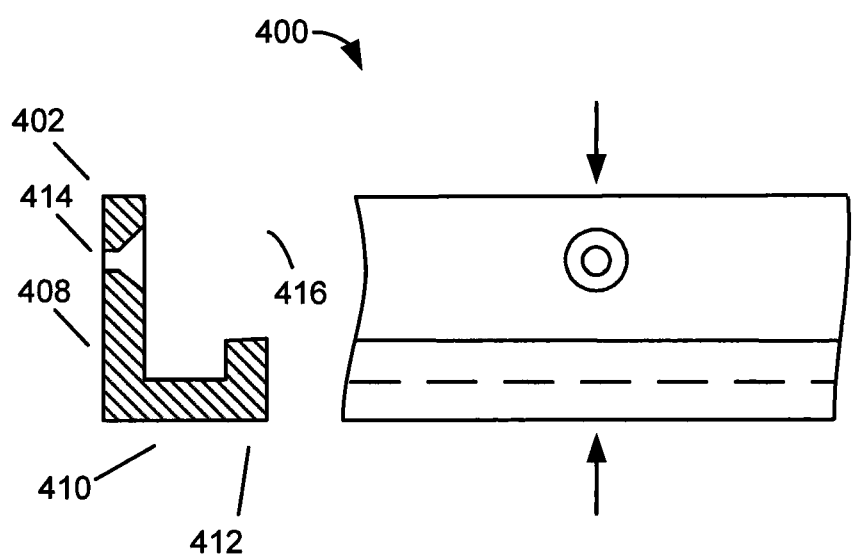
FIG. 4 is front view and cross section of a side-mounted track according to an embodiment of the invention having an L-shaped track section.

FIG. 4 is front view and cross section of a side-mounted track according to an embodiment of the invention having an L-shaped track section. The embodiment of FIG. 4 is similar to the embodiment of FIG. 1, except that the embodiment of FIG. 4 omits an upper surface and an upper lip from track 400. The arrangement of FIG. 4 allows a user to place a rolling-element bearing anywhere in the track, where it will be engaged only by the lower interior surface of the track and the lower lip 412. In particular, the arrangement of FIG. 4 obviates the need to only load a rolling-element bearing into an end of track 400, or through a cut-away such as cut-away 318 described above with respect to FIG. 3.

Figure 5:
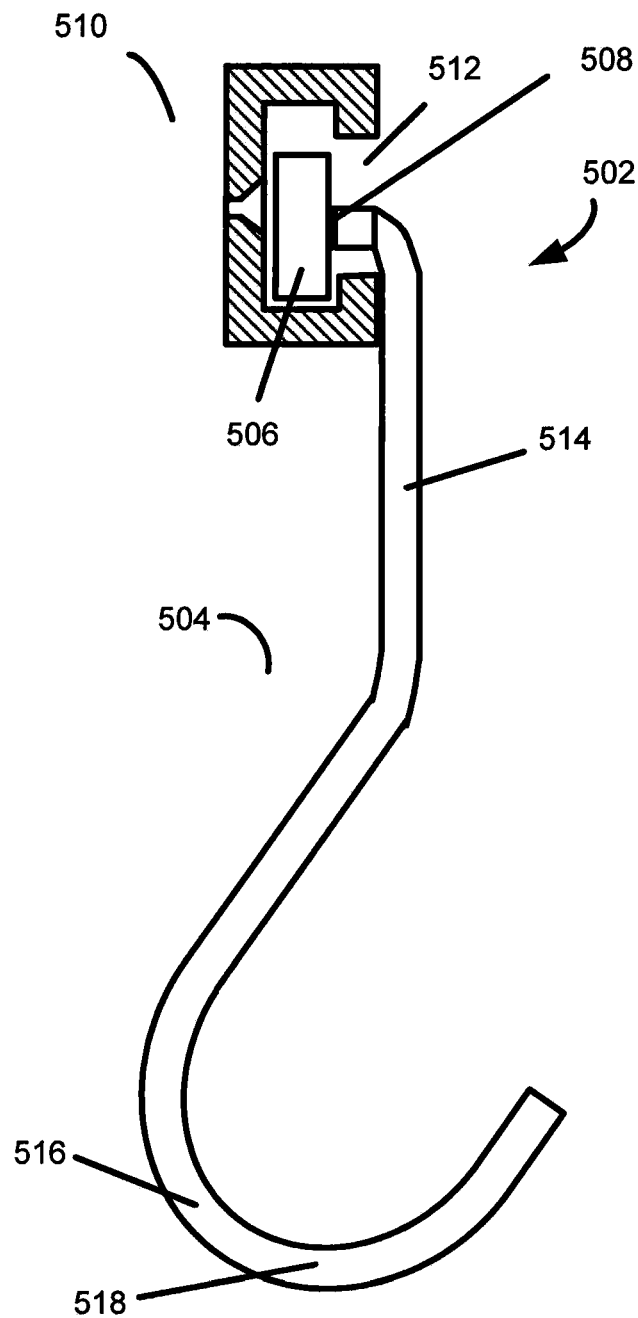
FIG. 5 is a schematic diagram of rolling-element bearing assembly including a hanger according to an embodiment of the invention.

FIG. 5 shows a rolling-element bearing assembly 502 including a hanger 504 according to an embodiment of the invention. The assembly of FIG. 5 includes a rolling-element bearing 506 coupled to hanger 504. The hanger 504 is coupled to an inner cylindrical roller of rolling-element bearing 506 by a knurled potion 508. In one embodiment, hanger 504 comprises 0.25" steel rod stock bent into a hook shape. In one embodiment, knurled portion 508 is cut into one end of the bar stock from which hanger 504 is fabricated. Rolling-element bearing assembly 502 is arranged such that rolling-element bearing 506 is inside the channel defined by c-channel track 510. Rolling-element bearing 506 engages and rolls on a lower-interior surface of c-channel track 510, and is engaged by and prevented from translating out of c-channel track 510 by two lips that define a gap 512. Hanger 504 is shaped such that it passes through gap 512 and wraps around a lower lip of track 510 without coming into contact with track 510 during normal operation. In one embodiment, hanger 504 has a straight vertical portion 514 and an asymmetrical u-shaped portion 516. In one embodiment, the point of lowest elevation of the u-shaped portion 518 is directly below (i.e., along a plumb line from) the middle or axis of rotation of rolling-element bearing 506 so that when an object is hung from hanger 504, rolling-element bearing 506 does not experience torque in the plane of FIG. 5. The hanger design 504 is exemplary only. Other hanger designs are acceptable, e.g., a carabiner type hanger, a closed loop, or other configurations are possible and within the scope of embodiments of the invention.

Figure 6:
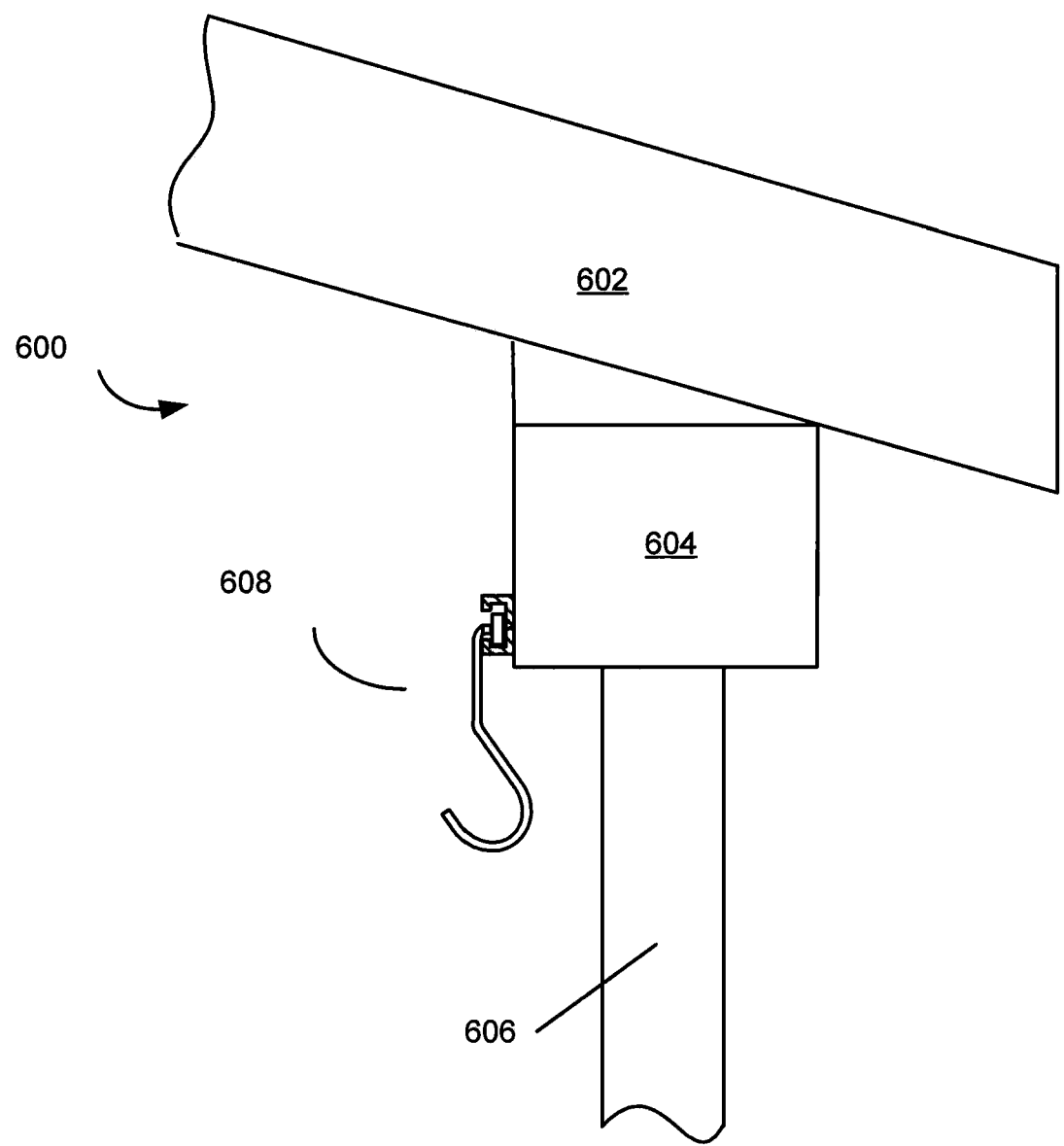
FIG. 6 is a schematic diagram of an installation arrangement of a track-roller-hanger assembly installed to a horizontal lintel according to an embodiment of the invention.

FIG. 6 is a schematic diagram of an installation arrangement 600 of a rolling-element bearing track assembly according to an embodiment of the invention. In the arrangement of FIG. 6 the major structural elements of a typical patio are provided, specifically, a plurality of roof beams 602 joined to a horizontal beam or lintel 604, which is supported by a plurality of vertical posts 606. A c-channel track is affixed to beam 604. Disposed in the interior channel defined by the c-channel track is a rolling-element bearing hanger assembly, for example, the assembly 502 described above with respect to FIG. 5. In the arrangement of FIG. 6, c-channel track is placed on an interior surface of beam 604, but placement on an exterior surface of beam 604 is acceptable as well. The arrangement of FIG. 6 allows a user to hang articles such as potted plants and adjust their horizontal position arbitrarily along the length of c-channel track.

The invention has been described with reference to certain specific embodiments. Those skilled in the art generally may develop other embodiments of the present invention. The terms and expressions that have been used to describe certain embodiments in the foregoing specification are terms of description, rather than limitation, and, in using such terms, there is no intention to exclude equivalents of the features shown and described. The scope of the invention is defined only by the claims that follow.

What is claimed is:

1. An apparatus for hanging decorative or utilitarian articles, comprising:
   a track having a vertical upper rear face, a vertical lower rear face, a horizontal lower face, and a vertical lower lip, wherein said track defines an interior channel and said upper rear face and said lower rear face define a plurality of through holes for fastening said track to a vertical surface;
   a rolling-element bearing sized to fit inside of said interior channel and adapted to directly engage and roll along an interior surface opposite said lower face;
   a hanger coupled to said rolling-element bearing, which bends around said lower lip, and hangs below said track.

2. The apparatus of claim 1 wherein said track further comprises a horizontal upper face and a vertical upper lip, wherein said track is a c-channel track, and wherein, said upper lip and said lower lip define a front-facing gap that is sized such that said rolling-element bearing cannot pass through said gap.

3. The apparatus of claim 2, wherein said hanger is arranged and sized to pass through the gap defined by the vertical upper lip and the vertical lower lip without interfering with the vertical upper lip or vertical lower lip.

4. The apparatus of claim 2, wherein said vertical lower lip defines a plurality of cut-away sections sized to locally increase the size of the gap to allow passage of said rolling-element bearing through said gap in the vicinity of the cut-away section.

5. The apparatus of claim 2, wherein said vertical upper lip defines a plurality of cut-away sections sized to locally increase the size of the gap to allow passage of said rolling-element bearing through said gap in the vicinity of the cut-away section.

6. The apparatus of claim 1, wherein said vertical lower lip defines a plurality of cut-away sections sized to locally increase the size of the gap to allow passage of said rolling-element bearing through said gap in the vicinity of the cut-away section.

7. The apparatus of claim 1, wherein the interior surface opposite said lower face defines a plurality of detents sized to partially capture said rolling-element bearing and create resistance to the motion thereof.

8. The apparatus of claim 1, wherein the lower face defines a plurality of through-slots passing from said lower face to said interior channel to facilitate the draining of liquid from said interior channel.

9. The apparatus of claim 1, wherein said hanger includes an asymmetric tilted u-shaped portion having a point of lowest elevation, and wherein said point of lowest elevation is located along a vertical line extending down from said rolling-element bearing.

10. The apparatus of claim 1, wherein said vertical upper rear face and said vertical lower rear face define a rear wall of said track, and further comprising a plurality of fastener holes disposed along a centerline of said rear wall of said track.

11. The apparatus of claim 10, further comprising a plurality of fasteners sized to fit into said fastener holes to secure said track to a vertical surface.

12. The apparatus of claim 11, wherein, when said track is secured to a vertical surface with said fasteners, at least some of said fasteners to not protrude above an interior surface of said rear wall.

13. The apparatus of claim 10, wherein said plurality of fastener holes comprises a first and a last fastener hole, and further comprising fasteners disposed in said first and last fastener holes sized in such a way to prevent the passage of a rolling element bearing along said interior channel.

* * * * *